Dec. 22, 1942.    N. S. LUND ET AL    2,305,929
SEDIMENTATION APPARATUS
Filed July 16, 1940    3 Sheets-Sheet 2
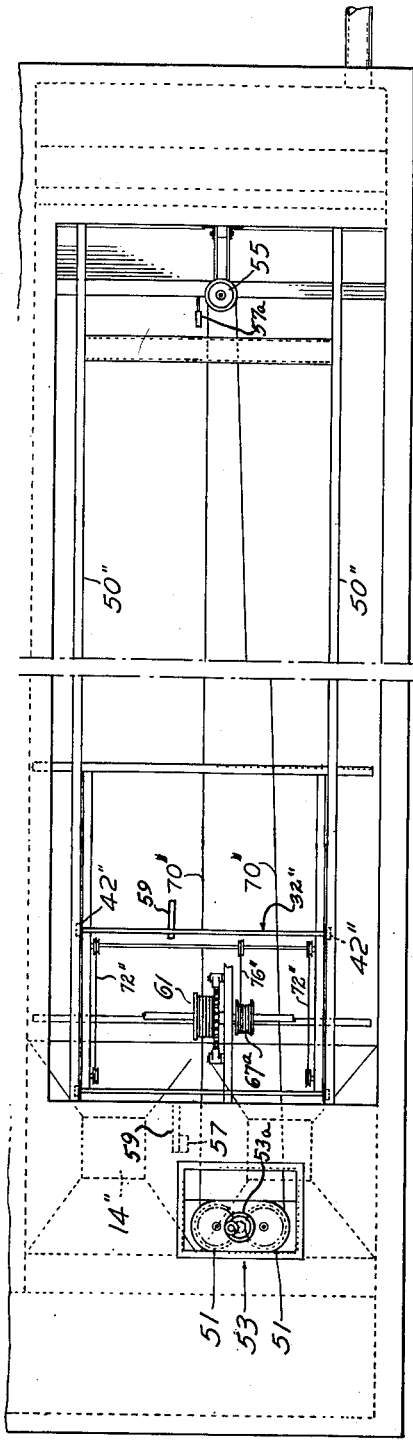
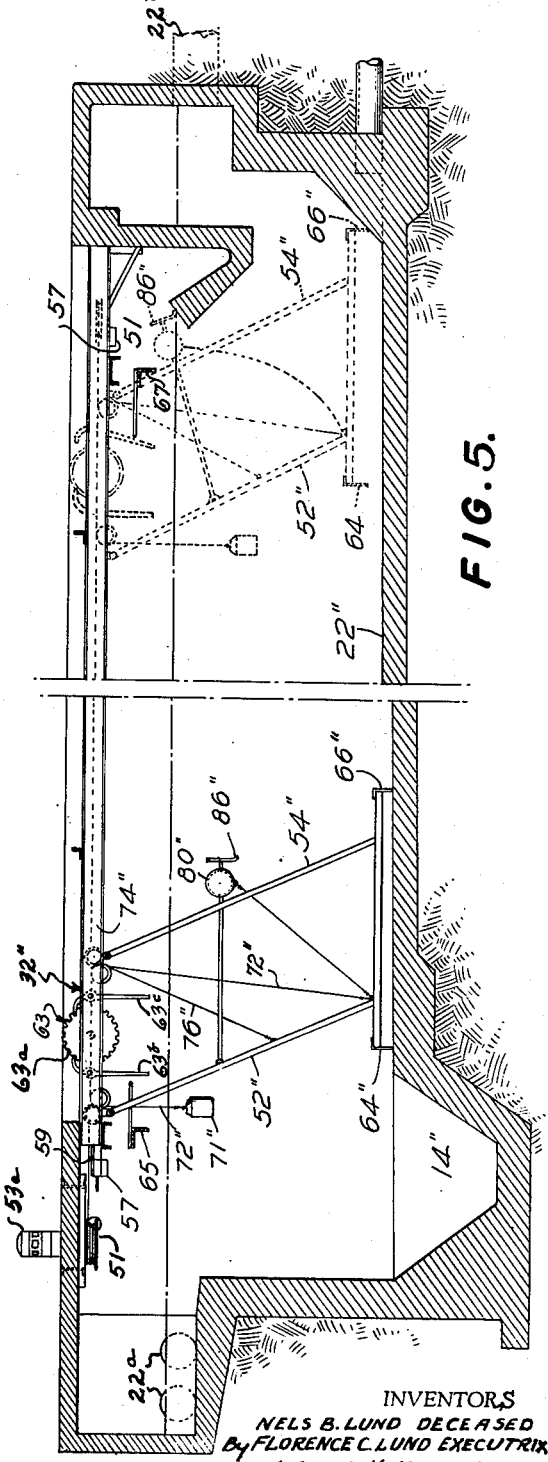
INVENTORS
NELS B. LUND DECEASED
By FLORENCE C. LUND EXECUTRIX
and JOHN H. KNOWLES
ATTORNEY.

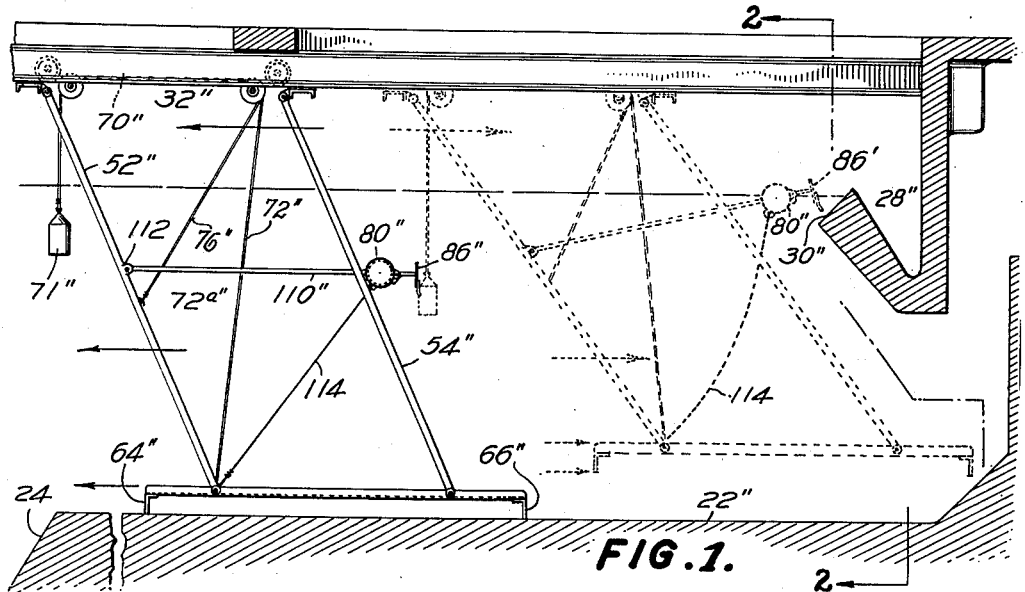
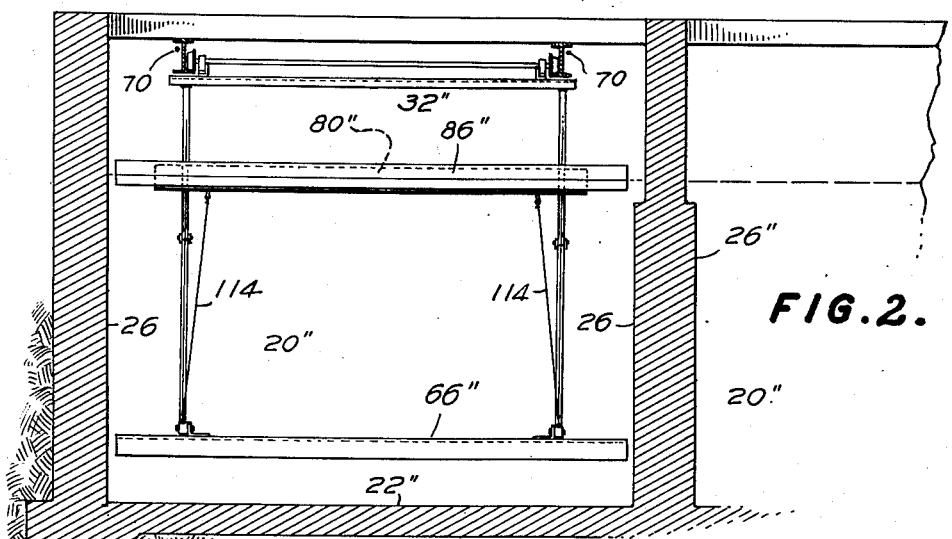
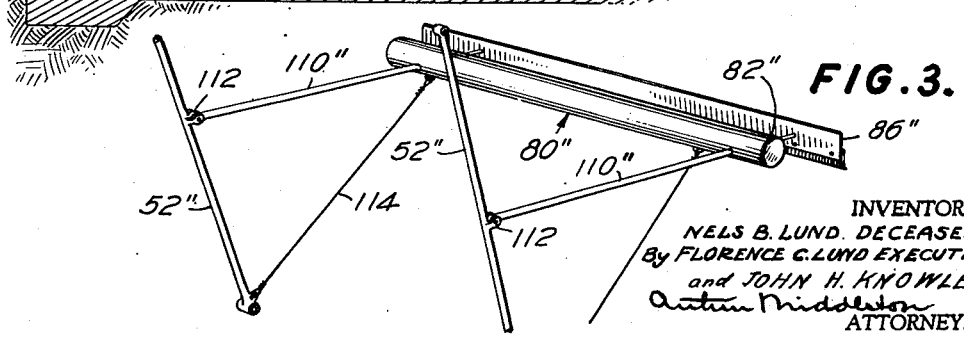

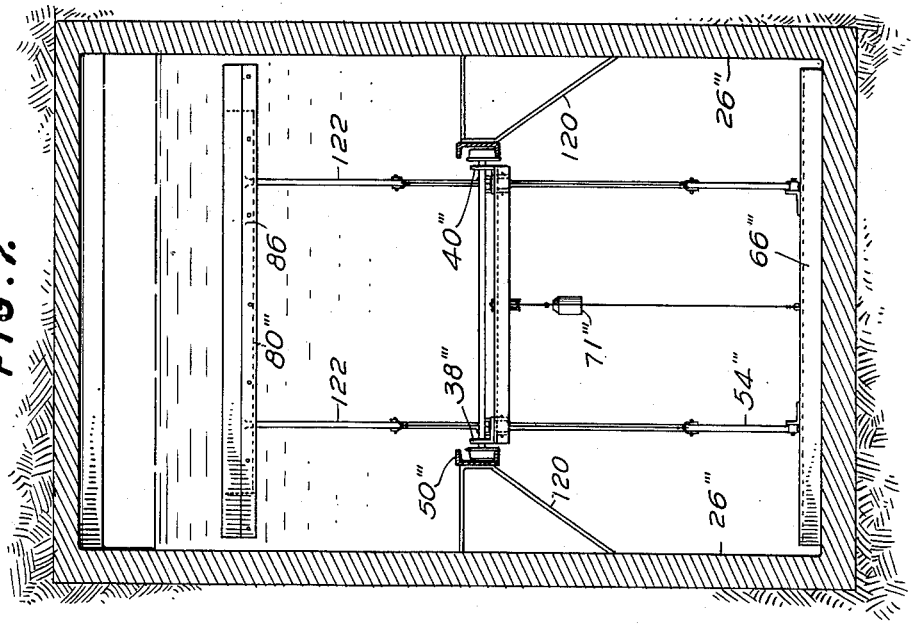
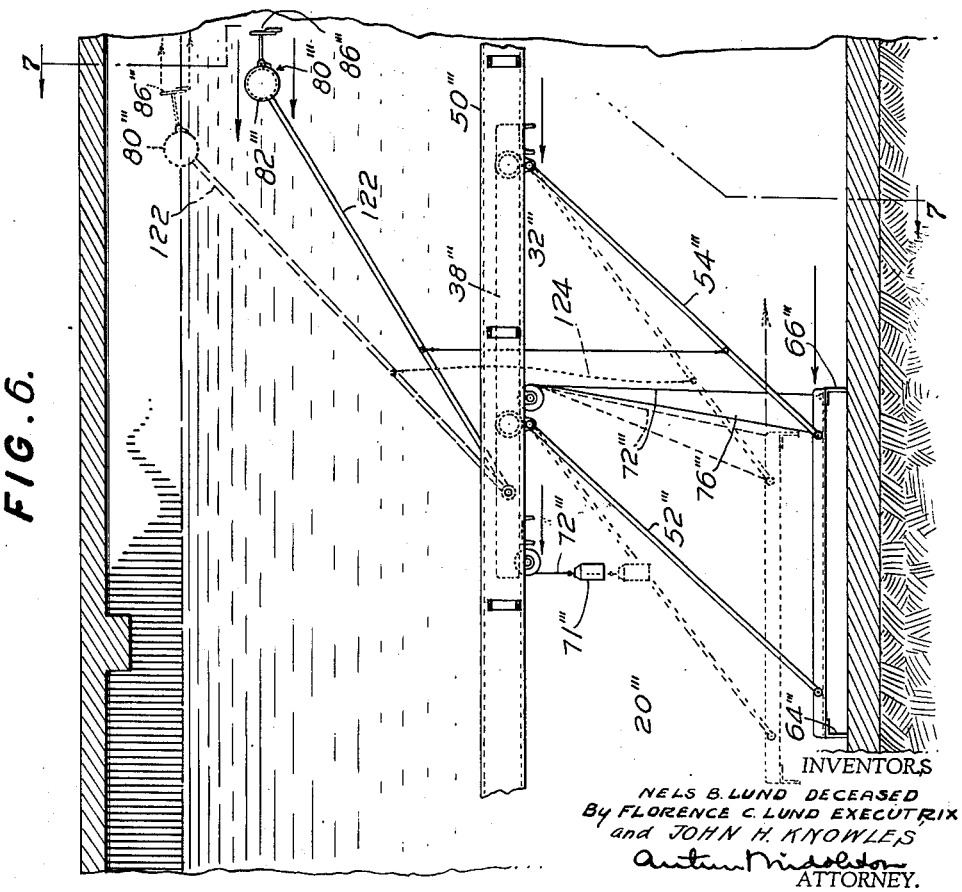

Patented Dec. 22, 1942

2,305,929

UNITED STATES PATENT OFFICE 2,305,929

SEDIMENTATION APPARATUS

Nels B. Lund, deceased, late of Larchmont, N. Y., by Florence C. Lund, executrix, Seaford, N. Y., and John H. Knowles, Larchmont, N. Y., assignors to The Dorr Company, Inc., New York, N. Y., a corporation of Delaware Application July 16, 1940, Serial No. 345,740

6 Claims. (Cl. 210—3)

The present invention relates to sedimentation apparatus and more particularly to liquid clarifiers and thickeners of the type in which it is sought to remove material that has collected at the bottom of a tank, as well as floating matter that collects at the surface of the liquid.

Apparatus of this type is extensively employed in the field of sanitation and sewage and in water purification systems and additionally has wide application in various chemical industries, as, for example, in the manufacture of paper where it is desired to remove the pulp from a liquid suspension thereof. In sewage and water purification systems, however, particularly the former wherein it is desired to remove from the sewer effluvium a considerable portion of the undissolved material carried in suspension therein, the presence of a relatively large percentage of lighter and finely divided substances which tend to rise and form a layer of scum at the surface of the liquid presents a serious problem in that the value of clarification depends to a certain extent, not only upon the efficiency with which the settled sludge is removed, but also on the efficiency with which the scum is swept from the surface of the liquid.

The process of removing or sweeping scum from the surface of the body of liquid in a clarifier tank by means of a vertically adjustable reciprocating skimmer blade or moving scum shield which is caused to travel back and forth across the tank in the vicinity of the liquid level of the tank to sweep the floating scum in advance thereof from the surface of the liquid is commonly in use. In certain apparatus of this type the skimmer blade is maintained at all times with its lower edge slightly below the surface of the liquid and operates to sweep the scum from the surface of the liquid while moving in both directions. In other such apparatus the blade is operative while moving in one direction only and drives before it the scum which has risen to the surface during the preceding return stroke of the blade during which time the blade has been maintained elevated from the surface of the liquid. In apparatus of this type, whether the blade operates in one direction only or in both directions, more or less constant attendance is required during the operation thereof due to fluctuations in the level of liquid in the tank, a rise in the level necessitating elevation of the blade, together with its supporting carriage, tracks, etc., to prevent undue agitation of the liquid in the surface regions thereof. Conversely, a lowering of the liquid level requires lowering of the blade and carriage in order that the full depth of the layer of floating scum may be effectively operated upon.

The present invention is designed to overcome the above-noted limitation that is attendant upon the use of carriage-suspended reciprocating skimmerblades of this sort and toward this end, and as the principal object thereof, contemplates the provision of a floating carriage which is buoyant in the tank and upon which the skimmer blade or scum shield is mounted for movement therewith. In this manner fluctuations in the level of liquid in the tank are automatically compensated for by the buoyancy of the carriage and thus constant attendance upon the apparatus in operation is not required.

Various other advantages accrue from the utilization of such a floating carriage for support of the skimmer blade and principal among these is the convenience with which the carriage may be correlated with the lower reciprocating sludge removing instrumentalities to give a mode of operation heretofore unattainable in connection with the suspended type of carriage. Particularly is this advantage apparent when compared to apparatus of this type in which the blade supporting carriage is independently operated, inasmuch as actuation of the additional scum removing instrumentalities is made difficult on account of the presence and interference of the other lower reciprocating sludge removing mechanism.

Where correlation has been attained between the suspended type of carriage, various and ingenious mechanical compensating contrivances must be employed to effect proper operation of the scum removing blade both in its operative and inoperative phases at any of its various potential levels of operation. By utilizing a buoyant floating carriage in accordance with the present invention, no compensative mechanism is required and the blade will function automatically both in its operative and inoperative phases by assuming a proper constant level of effectiveness with respect to the fluctuating level of liquid in the clarifier tank.

Accordingly, it is among the important objects of the invention to provide a sedimentation apparatus of this character having a scum removing blade supported upon and movable bodily with a reciprocating buoyant floating carriage in which the carriage is so correlated with the usual lower sludge removing or scraping instrumentalities that the blade is caused to assume its operative and inoperative positions automatically and shift from one to the other upon similar shifting movement of the lower sludge removing instrumentalities.

In carrying out the above-mentioned object, the invention, in one embodiment thereof, contemplates the provision of a linkage system between the lower scraper blade or screed supporting carriage and the skimmer blade supporting carriage whereby the two carriages reciprocate bodily in unison and whereby lowering of the lower scraper blades or screeds onto the floor of the tank preparatory to commencement of their operative sludge propelling stroke will cause tilting movement of the skimmer blade supporting carriage in such a manner that the skimmer blade will be lifted clear of the floating scum and remain in an operative position during the travel of the carriage across the tank. Conversely it is contemplated that elevation of the lower scraper blades from the floor preparatory to commencement of the return stroke thereof will cause tilting movement of the carriage in the opposite direction to restore the skimmer blade to its operative partially submerged position.

In a modified form of the invention, the linkage system employed between the skimmer blade supporting carriage and the lower scraper blade supporting carriage is so designed that lowering of the blades onto the floor of the tank will cause complete submergence of the skimmer blade and its supporting carriage, such submergence and consequent inoperativeness of the blade being maintained throughout the entire operative sludge impelling stroke of the scraper blades. Likewise, conversely, elevation of the scraper blades from the floor of the tank will cause release of the submerged buoyant blade supporting carriage in order that the same may seek its proper level at the surface of the liquid and, by floating thereon, maintain the scum removing blade properly oriented and partially submerged for most effective removal of the scum.

It is another object of the invention to provide a sedimentation apparatus of the character set forth above in which there is provided the usual scum removal trough having an edge or lip which is positioned above the level of liquid in the tank and with which there is associated an inclined surface or ramp upon which the accumulated scum from each operative stroke of the skimmer blade is adapted to be impelled upwardly by the blade which, being yieldably supported to accommodate its buoyancy, is thus free to move bodily upwardly on the ramp as the supporting carriage for the same approaches the end of its operative stroke.

Other objects and advantages of the invention, not at this time enumerated, will become more readily apparent as the nature of the invention is better understood.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings.

In the accompanying six sheets of drawings there have been illustrated several embodiments of the invention. In these drawings:

Fig. 1 is a fragmentary side elevational view, partly in section, showing a form of sludge and scum removing apparatus operatively disposed within a sedimentation tank, comprising a submersible buoyant skimmer device or floating skimmer carriage.

Fig. 2 is a fragmentary sectional view taken substantially along the line 2—2 of Fig. 1.

Fig. 3 is a fragmentary perspective view of the skimmer blade and supporting floating skimmer carriage shown in Figs. 1 and 2.

Fig. 4 is a plan view showing the sludge and scum removing apparatus of Figs. 1, 2 and 3 operatively disposed within the sedimentation tank.

Fig. 5 is a side elevational view partly in section of the apparatus shown in Fig. 4.

Fig. 6 is a fragmentary side elevational view similar to Fig. 1, showing a modified form of apparatus.

Fig. 7 is a sectional view taken substantially along the line 7—7 in Fig. 6.

In all of the above-described views, like characters of reference are employed to designate like parts throughout.

Referring to Figures 1, 2, 3, 4, 5, a form of the invention is shown wherein the buoyant floating blade supporting carriage 80" is connected to the screed supporting carriage 32" by a linkage system so designed that lowering of the screeds 64" and 66" onto the floor 22" of the tank 20" will cause complete submergence of the carriage 32" together with the skimmer blade 86" supported thereon, such submergence and consequent inoperativeness of the blade being maintained throughout the entire operative sludge impelling stroke of the carriage assemblies 32" and 80".

In this form of the invention a single elongated float member 82" (Fig. 3) is suspended between a pair of links 110, the latter being pivoted as at 112 to the screed supporting links 52" medially thereof and carrying therebetween at their free ends the skimmer blade 86". A pair of cables 114 connect the float 82" to the point of pivotal connection between the lower screed frame and the links 52" and the cables are of such length that when the screed frame is in its lowermost position with the screeds 64" and 66" in contact with the floor 22", the links 110" assume a substantially horizontal position and the entire carriage 80" is submerged. Upon elevation of the screeds 64" and 66" to their inoperative positions as shown in Fig. 1, the buoyant carriage 80" is released by the cables 114 and is free to seek the uppermost level of the liquid where it will remain in a buoyant state during the operative scum collecting stroke of the carriage 80" with the blade 86" properly oriented with respect to the liquid level for efficient impelling of the scum across the surface of the liquid in the sedimentation tank.

In this latter form of the invention, the skimmer blade 86" is adapted to progressively move upwardly upon the inclined surface or ramp 30" of the scum trough 28".

In addition, this latter form of the invention has been illustrated in connection with a twin tank arrangement in which two sedimentation basins are arranged in side-by-side relationship as shown in Fig. 2. Since the sludge and scum removal instrumentalities contained in each sedimentation basin are identical in construction an illustration of but one set of these instrumentalities has been made.

The operating means for raising and lowering the screeds are described on the basis of Figs. 4 and 5, and it is understood that they may be considered applicable in a similar manner to the other embodiment herein presented. These operating means include the main drive cable 70″. Counter-weight cables 72″ are provided with counter-weights 71″ and their function is to balance a portion of the weight of the members 60, 52, and 54 of the swingable collector frame, latter operates by reason of continued movement of the cable 70″ after the carriage has reached the end of its travel in either direction to raise or lower the screeds as the case may be. The endless cable or main drive rope 70″ is coiled around and frictionally held upon one or more drums 51 of a reversible power driven rope drive mechanism 53 at one end of the tank. At the other end of the tank the cable 70″ passes over a stationary pulley 55. Reversal of the rope drive mechanism 53 is controlled by a pair of reversal switches diagrammatically indicated at 57, one at each end of the tank. The driving cable 70″ is normally held in fixed driving relation to the carriage 80″ through the intermediary of a winding drum 61, the potential rotation of which serves to permit the cable 70″ to override the path of travel of the carriage 32″ to raise or lower the screed frame as the case may be. Accordingly, a pawl and ratchet device 63 having a ratchet 63ᵃ and a pair of opposedly arranged pawls 63ᵇ and 63ᶜ, serves to lock the drum 61 in fixed position against the pull of the drive rope 70″ in the one or the other direction, and to consequently normally hold the cable 70″ and carriage 32″ in driving relationship. The pawls 63ᵇ and 63ᶜ are designed for engagement with a pair of abutments 65 and 67 at the opposite ends of the tank by means of which the drum 61 is released and the cable 70″ permitted to override the travel of the carriage to lower the screed frame at the beginning of its operative stroke and to elevate the same at the end thereof. This is because the screed lifting cable 76″ is wound around and has its end fixed to an auxiliary winding drum 67ᵃ which rotates together with the drum 61. It will be understood that the carriage 80‴ in a form of the invention subsequently to be described, may be similarly propelled and actuated.

In other words, as the drive mechanism 53 comprising a pair of rope winding drums 51 and the main drive rope 70″ pull the carriage diagrammatically indicated in Figs. 4 and 5 by the numeral 32″, in the direction towards the sump 14″ and effluent outlet 22ᵃ, the pawl 63ᵇ will hold the ratchet 63ᵃ locked against rotation until the carriage is arrested at the end of its track when the abutment 65 engages the pawl 63ᵇ, thereby disengaging it from the ratchet 63ᵃ. Continued movement of the drive rope 70″ will then rotate the ratchet 63ᵃ so as to raise the sludge conveying screed members 64″ and 66″ to a predetermined point of elevation when a switch actuating member which may be suitably fixed to the rope (but is herein not shown), or some other suitably arranged means associated with the rope, will actuate the switch 57 to effect reversal of the rope drive motor 53ᵃ. Consequently, the rope 70″ will begin to pull the carriage in the opposite direction with the raking means in raised position and the ratchet 63ᵃ locked by the pawl 63ᶜ against rotation from the pull of the drive rope 70″. Again, when the carriage 32″ is arrested at the influent end of the tank (the influent end being identified by the influent connection 22ᵇ), the pawl 63ᶜ will be engaged by abutment 67, thereby releasing the ratchet 63ᵃ for rotation by the continued pulling movement of the drive rope 70″ until the raking means on the carriage are raised to a predetermined elevation as shown in the dotted line position of the mechanism in Fig. 5. At this point, again suitable means cooperatively associated with the drive (herein not shown), become active to operate the switch 57ᵃ in order to reverse the drive motor 53ᵃ and thus to start a new raking cycle. A disclosure of a reciprocating raking mechanism (using the pull of the main drive rope for lifting and lowering the raking means) is found in the patent to Lund, No. 2,101,081, and consequently whatever parts are not shown in the present instance, such as the means whereby the drive rope operates the reversal switches 57 and 57ᵃ are disclosed in that earlier patent.

In Figs. 6 and 7 a modified form of the invention is shown in which the longitudinally extending beams or tracks 50‴ are submerged in the liquid contained in the sedimentation tank and and are supported from the side walls 26‴ thereof by means of suitable brackets 120. The front links 52‴ of the screed carriage framework are pivoted to the longitudinal members or angle pieces 38‴ and 40‴ medially thereof and occupy forwardly and downwardly extending positions in parallelism with the rear links 54‴ whereby the lower screed frame including the screeds 64‴ and 66‴ are pushed forwardly on the floor 22‴ of the tank 20‴ instead of being dragged as in the previous forms of the invention. During the inoperative stroke of the screed carriage 32‴, the screed frame is elevated from the floor of the tank by means of the lifting cable 76‴.

The skimmer blade supporting carriage 80‴ is similar in many respects to the carriage 80″ shown in Figs. 1, 2 and 3 and is pivotally connected by means of a pair of links 122 to the forward portions of the longitudinal angle pieces 38‴ and 40‴. A pair of cables 124 are connected at opposite ends to the links 122 and 54‴ medially thereof and are of such length that when the screeds 64‴ and 66‴ are in their operative lowered positions in contact with the floor 22‴, the skimmer blade supporting carriage 80‴ is maintained submerged. Conversely, when the screeds 64‴ and 66‴ are in their raised positions, the link 122, together with the carriage 80‴ carried thereby, is released and the float member 82‴ will seek the uppermost level of the liquid in the tank 20‴. The fixed angularity of the carriage 80‴ as a whole with respect to the link 122 is such that when the carriage 80‴ is released in the manner just described, the skimmer blade 86‴ will occupy a substantial vertical position at the surface of the liquid with its lower edge extending below the level of the liquid. The blade 86‴ is designed for cooperation with a scum trough having a ramp leading thereto in the manner previously described in connection with the other form of the invention. Such a trough and ramp have not been disclosed in Figures 6 and 7, but it is believed that the application of such a trough will be obvious by reference to Figure 1.

The invention is not to be limited to the exact arrangements of parts shown in the accompanying drawings as various changes in the details of construction may be resorted to without departing from the spirit of the invention. For example, while several embodiments of the invention have been shown, including plural float members arranged in spaced relationship with their axes extending transversely in alignment, plural float members spaced apart and having their axes in parallelism, and a single transversely extending float member, it will be understood that by slight modification single or plural float members may be employed in connection with any of the various linkage systems shown while at the same time the essential features of the invention are at all times preserved. Only insofar as the invention has particularly been pointed out in the appended claims is the same to be limited.

What is claimed is:

1. In an apparatus for removing floating material or scum from the surface of liquid in a longitudinal sedimentation tank, a reciprocable carriage movable in opposite directions across the tank, means for reciprocating the carriage, a float member disposed within the tank and adapted to be supported to float by its buoyancy on the surface of the liquid, means connecting the float member and carriage whereby the former is movable bodily with the latter across the tank, a skimmer blade secured to the float member and normally extending below the level of the liquid, and means for lowering the float member and blade from its floating position bodily into a submerged position and for maintaining the same submerged in the body of liquid contained in said tank during the movement of the carriage in said one direction.

2. In a sediment-collecting reciprocating mechanism for settling tanks, a reciprocable carrier movable along a predetermined path across the tank, a sediment collector frame pivotally suspended from said carrier and depending into the tank and movable in a controlled manner between an inoperative raised and an operative lowered angular position, said collector frame being adapted to convey sediment along the tank bottom while in said operative position and travelling in one direction and to remain inoperative when travelling in the opposite direction, a float member adapted to be supported by its buoyancy within the tank on the surface of the liquid therein, a skimmer blade secured to the float member, a link secured to the float member at one end and pivotally secured to the carrier at the other end thereof for impelling the float member in unison with the carrier, and a connection between the float member and collector frame for moving the former in accordance with the angular movements of the latter, said connection being effective to lower the float member and blade and submerge the same in the body of liquid contained in the tank when the collector frame is lowered.

3. In a sediment collecting reciprocating mechanism for settling tanks, a reciprocable carriage movable along a predetermined path across the tank and including a carrier and a sediment collector frame pivotally suspended from the carrier and depending into the tank and movable in a controlled manner between an inoperative raised and operative lowered angular position, said collector frame being adapted to convey sediment along the tank bottom while in said operative position and traveling in one direction and to remain inoperative when travelling in the opposite direction, a float member adapted to be supported by its buoyancy within the tank on the surface of the liquid therein, a skimmer blade secured to the float member, a link secured to the float member at one end and secured to the carriage at the other end thereof for impelling the float member in unison with the carriage, and a connection between the float member and collector frame for moving the former in accordance with the angular movements of the latter, said connection being effective to lower the float member and blade and submerge the same in the body of liquid contained in the tank when the collector frame is lowered.

4. In a sediment-collecting reciprocating mechanism for settling tanks, a reciprocable carrier movable along a predetermined path across the tank, a sediment collector frame pivotally suspended from said carrier and depending into the tank and movable in a controlled manner between raised and lowered angular positions to convey sediment along the tank bottom while travelling in one direction and to remain inoperative in the other direction, a float member adapted to be supported by its buoyancy within the tank on the surface of the liquid therein, a skimmer blade secured to the float member, and normally intercepting the horizontal plane of the surface of the liquid in the tank, a link pivoted at one end to the carrier and secured at the other end to said float member, a flexible cable connecting the frame and float member, and means for varying the angular position of the frame to apply tension to the cable and overcome the buoyant equilibrium of the float member and submerge the same.

5. In a sediment collecting reciprocating mechanism for settling tanks, a reciprocable carrier movable along a predetermined path across the tank, submerged track means for said carrier, defining said path, a sediment collector frame pivotally suspended from said carrier and movable in a controlled manner between an inoperative raised and an operative lowered angular position, said collector frame being adapted to convey sediment along the tank bottom while in said operative position and travelling in one direction and to remain inoperative when travelling in the opposite direction, a float member adapted to be supported by its buoyancy within the tank on the surface of the liquid therein, a skimmer blade connected with the float member and normally intercepting the horizontal plane of the scum, a swingable member pivoted to the carrier and being secured at its free end to the float member, means comprising a flexible cable, for connecting said collector frame with said swingable member, for lowering the float member and blade from its floating position bodily into a submerged position and for maintaining the same submerged in the body of liquid contained in said tank during the movement of the carrier in said one direction.

6. In a sediment-collecting reciprocating mechanism for settling tanks, a reciprocable carrier movable along a predetermined path across the tank, a sediment collector frame pivotally suspended from said carrier and depending into the tank and movable in a controlled manner between an inoperative raised and an inoperative lowered angular position, said collector frame being adapted to convey sediment along the tank bottom while in said operative position and traveling in one direction and to remain inoperative when travelling in the opposite direction, a float member adapted to be supported by its buoyancy within the tank on the surface of the liquid therein, a skimmer blade secured to the float member, a link secured to the float member at one end and to the collector frame at the other end thereof for impelling the float member in unison with the carrier, and a connection between the float member and collector frame for moving the former in accordance with the angular movements of the latter, said connection being effective to lower the float member and blade and submerge the same in the body of liquid contained in the tank when the collector frame is lowered.

FLORENCE C. LUND.
*Executrix of the Last Will and Testament of Nels B. Lund, Deceased.*

JOHN H. KNOWLES.